(12) United States Patent
Huang

(10) Patent No.: US 7,974,458 B2
(45) Date of Patent: Jul. 5, 2011

(54) SYSTEM AND METHOD FOR DETECTING DEFECTS IN CAMERA MODULES

(75) Inventor: Chih-Wei Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 928 days.

(21) Appl. No.: 11/875,123

(22) Filed: Oct. 19, 2007

(65) Prior Publication Data

US 2008/0247634 A1 Oct. 9, 2008

(30) Foreign Application Priority Data

Apr. 4, 2007 (CN) .......................... 2007 1 0200386

(51) Int. Cl.
*G06K 9/00* (2006.01)
*H04N 9/64* (2006.01)
(52) U.S. Cl. ......... 382/149; 382/141; 348/246; 348/247
(58) Field of Classification Search .................. 382/149; 348/246–247
See application file for complete search history.

(56) References Cited

U.S. PATENT DOCUMENTS

| | | | | |
|---|---|---|---|---|
| 5,517,234 A * | 5/1996 | Gerber et al. | | 348/126 |
| 5,854,655 A * | 12/1998 | Watanabe et al. | | 348/247 |
| 6,618,185 B2 * | 9/2003 | Sandstrom | | 359/292 |
| 6,683,643 B1 * | 1/2004 | Takayama et al. | | 348/247 |
| 6,751,005 B1 * | 6/2004 | Barnick et al. | | 359/290 |
| 6,965,395 B1 * | 11/2005 | Neter | | 348/129 |
| 7,061,226 B2 * | 6/2006 | Durr | | 324/121 R |
| 7,162,073 B1 * | 1/2007 | Akgul et al. | | 382/149 |
| 7,783,102 B2 * | 8/2010 | Kawaragi | | 382/145 |
| 2003/0151673 A1 * | 8/2003 | Hashimoto et al. | | 348/220.1 |
| 2003/0179418 A1 * | 9/2003 | Wengender et al. | | 358/437 |
| 2004/0051798 A1 * | 3/2004 | Kakarala et al. | | 348/246 |
| 2004/0096125 A1 * | 5/2004 | Alderson et al. | | 382/312 |
| 2005/0008215 A1 * | 1/2005 | Shepard | | 382/141 |
| 2005/0123211 A1 * | 6/2005 | Wong et al. | | 382/254 |
| 2005/0238250 A1 * | 10/2005 | Jo | | 382/275 |
| 2006/0126127 A1 * | 6/2006 | Stanback et al. | | 358/474 |
| 2006/0170811 A1 * | 8/2006 | Joung | | 348/342 |
| 2007/0058056 A1 * | 3/2007 | Kaplinsky et al. | | 348/272 |
| 2008/0205747 A1 * | 8/2008 | Kuchii | | 382/149 |
| 2008/0247634 A1 * | 10/2008 | Huang | | 382/149 |
| 2009/0016638 A1 * | 1/2009 | Nagatsuma et al. | | 382/275 |
| 2009/0129663 A1 * | 5/2009 | Chen | | 382/149 |
| 2011/0043668 A1 * | 2/2011 | McKinnon et al. | | 348/246 |

FOREIGN PATENT DOCUMENTS

CN 1723384 A 1/2006

\* cited by examiner

*Primary Examiner* — Bhavesh M Mehta
*Assistant Examiner* — Gandhi Thirugnanam
(74) *Attorney, Agent, or Firm* — Jeffrey T. Knapp

(57) ABSTRACT

A method for detecting defects in camera modules is provided. The method includes the following: an image is acquired from the camera module; a comparison formula and a standard value of defect luminance are set; the image is divided into many test regions; the corresponding reference regions are then plotted out; a test region is selected, and a reference region is confirmed correspondingly; averages of gray scale values of the selected test region and the confirmed reference region are calculated; a defect luminance of the selected test region is calculated; the calculated defect luminance is compared with the standard value for confirming whether the camera module is of satisfactory quality. A related system is also disclosed.

11 Claims, 5 Drawing Sheets

|  | Value (Pixels) | Average of gray scale values |
|---|---|---|
| Size of test regions | 15*15 | 136.4 |
| Size of reference regions | 60*60 | 153.1 |
| Spacing size | 60*60 |  |
| Standard value (%) | 4% |  |
| Defect luminance (%) | 10.9% |  |
| Test result | Out of quality |  |

FIG. 5

SYSTEM AND METHOD FOR DETECTING DEFECTS IN CAMERA MODULES

BACKGROUND OF THE INVENTION

1. Field of the Invention

The present invention relates to camera modules, especially to a system and method for detecting defects in camera modules.

2. Description of Related Art

With the continuing development in the technology of digital image processing, more and more camera modules are made to be used in hand-held consumer electronic devices, such as digital cameras, computers, mobile phones, PDAs (Personal Digital Assistants), and image processing machines, and so on, for providing the consumer electronic devices to have the capability to capture images. Generally, each of the camera modules includes an image sensor, lens, a lens holder, and other equipments or elements. In recent years, with the demands for the consumer electronic devices continually increasing, the demand for the camera modules has grown correspondingly. For improving and ensuring adequate product quality, it is essential to perform quality inspection on the product, including the components of the camera modules for ensuring manufacturing process stability and product consistency.

Generally, camera module manufacturers test the camera modules by evaluating and assessing images captured by the camera modules and determining whether the images have defects by means of manual visual examination. This takes a lot of time and money, and can seriously affect the accuracy and efficiency of the testing performed, especially when a great number of camera modules need to be tested.

What is needed is a system and method that can detect defects in the images captured by the camera modules automatically so as to determine whether the camera modules are of sufficient quality.

SUMMARY OF THE INVENTION

A system for detecting defects in camera modules is provided. The system includes an image acquiring module, a region setting module, a region dividing module, a calculating module, and a luminance comparing module. The image acquiring module is configured for acquiring an image from the camera module. The region setting module is configured for setting a comparison formula to calculate defect luminance, and for setting a standard value for the defect luminance. The region dividing module is configured for dividing the image into a plurality of test regions, and for plotting out a plurality of reference regions corresponding to the test regions. The calculating module is configured for selecting each of the test regions and confirming a reference region corresponding to the selected test region, for calculating averages of gray scale values of the selected test region and the confirmed reference region, and for calculating a defect luminance of the selected test region according to the calculated averages of gray scale values by utilizing the comparison formula. The luminance comparing module is configured for comparing the calculated defect luminance with the standard value, for confirming whether the camera module is of satisfactory quality by testing whether the defect luminance of each test region is not larger than the standard value.

Furthermore, a method for detecting defects in camera modules is provided. The method includes the following: acquiring an image from the camera module; setting a comparison formula to calculate a defect luminance; setting a standard value for the defect luminance; dividing the image into a plurality of test regions; plotting out a plurality of reference regions corresponding to the test regions; selecting a test region and confirming a reference region corresponding to the selected test region; calculating averages of gray scale values of the selected test region and the confirmed reference region; calculating a defect luminance of the selected test region according to the calculated averages of gray scale values by utilizing the comparison formula; comparing the calculated defect luminance with the standard value; repeating the selecting the test region step through the comparing the calculated defect luminance step to test each of the other test regions if the defect luminance is not larger than the standard value; and confirming whether the camera module is of satisfactory quality based on the test results in the comparing step.

Other advantages and novel features of the present invention will become more apparent from the following detailed description of preferred embodiments when taken in conjunction with the accompanying drawings.

BRIEF DESCRIPTION OF THE DRAWINGS

FIG. 5 is a schematic diagram illustrating a method for outputting data.

DETAILED DESCRIPTION OF THE INVENTION

Figure 1:
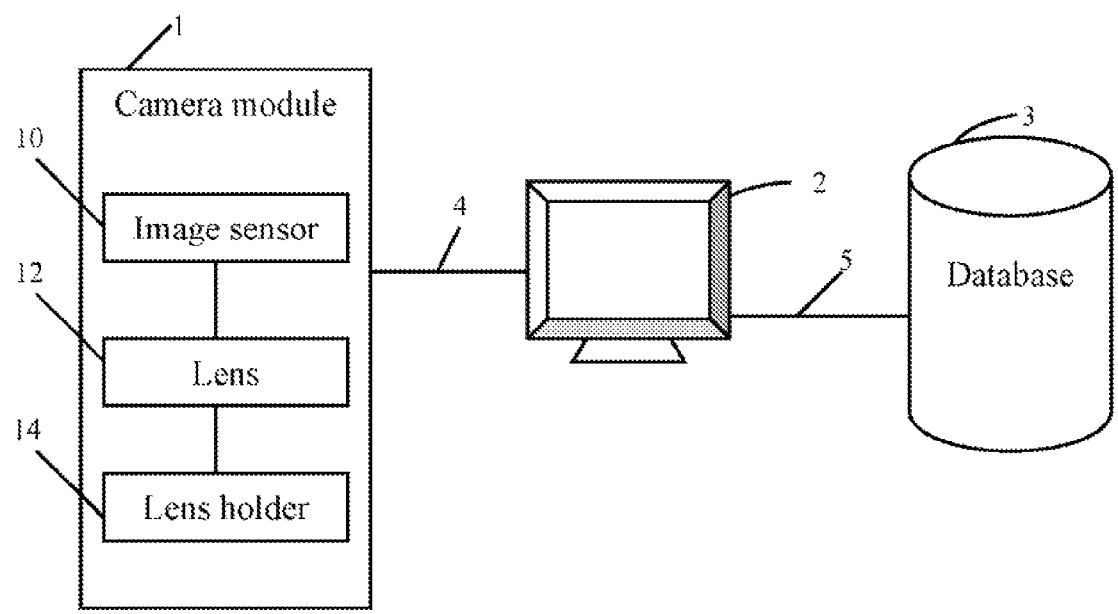
FIG. 1 is a schematic diagram illustrating a hardware configuration of a system for detecting defects in camera modules in accordance with a preferred embodiment of the present invention.

FIG. 1 is a schematic diagram illustrating a hardware configuration of a system for detecting defects in camera modules (hereinafter, "the system") in accordance with a preferred embodiment of the present invention. The hardware configuration of the system may include a camera module 1 to be tested, at least one computer 2, and at least one database 3. The camera module 1 typically includes an image sensor 10, a lens 12, and a lens holder 14. The camera module 1 may be installed in the computer 2, a mobile phone, a digital camera, or any other suitable devices. The image sensor 10 may be a charged coupled device (CCD) or a complementary metal-oxide-semiconductor transistor (CMOS) for capturing images.

The computer 2 communicates with the camera module 1 through a data cable 4 for acquiring the image from the camera module 1. The computer 2 may be a common computer, such as a personal computer, a laptop, a portable handheld device, a mobile phone, or any other suitable electronic communication terminal. The data cable 4 is used for transmitting data, such as video data and image data etc.

The computer 2 is electronically connected with the database 3 via a connection 5. The database 3 is configured for storing various kinds of data, such as the image acquired from the camera module 1, calculated data, test results, and so on. The database 3 may be in the form of a hard disk (not shown) located in the computer 2, or a storage device located outside of the computer 2. The connection 5 is a database connectivity, such as an open database connectivity (ODBC) or a Java database connectivity (JDBC), for example.

The system according to the preferred embodiment is used for acquiring the images from the camera module 1, performing inspections and testing to the images, determining assessing as to whether defects are found so as to be able to confirm whether the camera module 1 is of satisfactory quality. In addition, the test results are then outputted.

Figure 2:
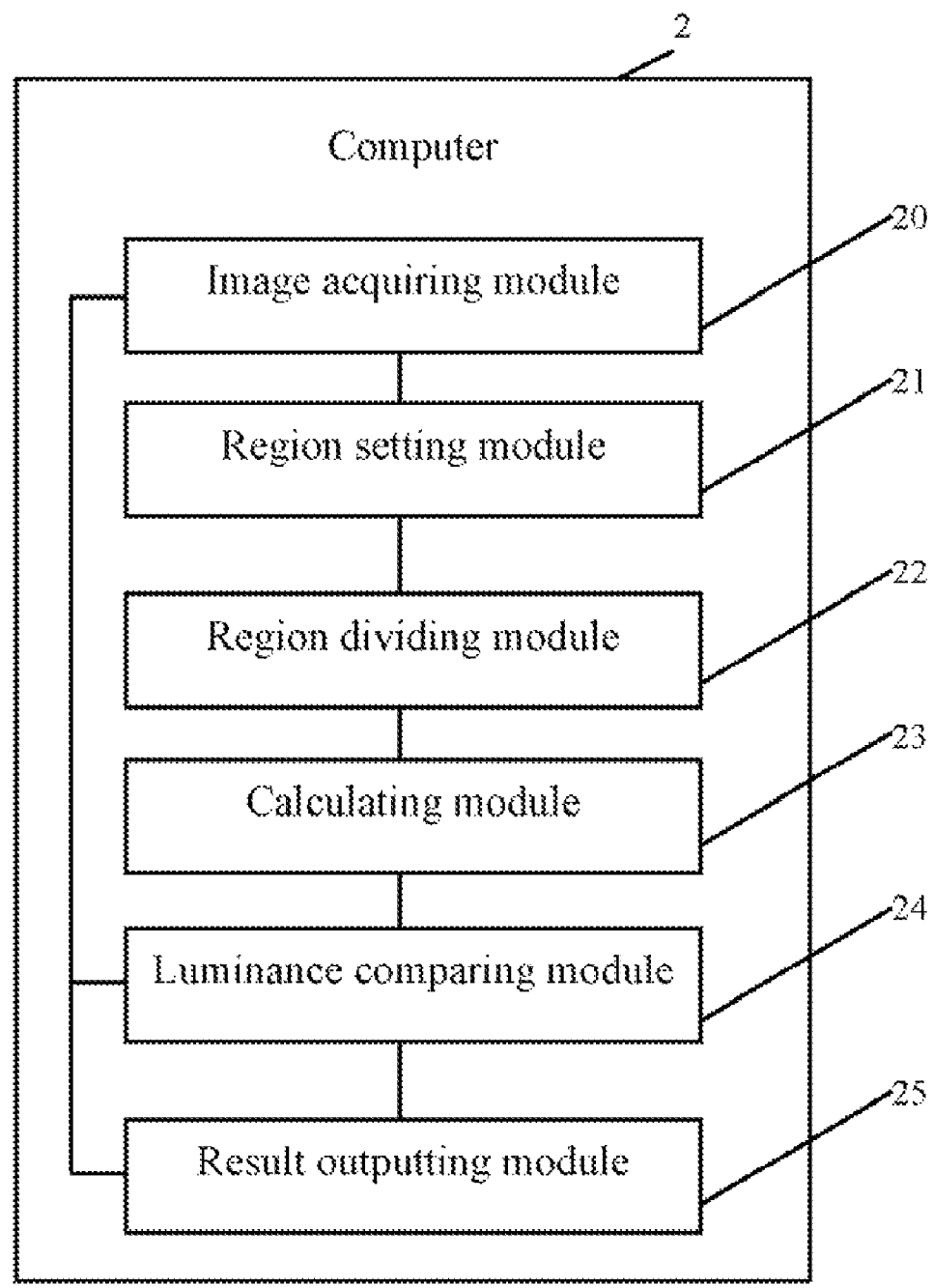
FIG. 2 is a schematic functional block diagram illustrating a plurality of functional modules in a computer in accordance with the preferred embodiment.

FIG. 2 is a schematic functional block diagram illustrating a plurality of functional modules in the computer 2 in accordance with the preferred embodiment. The computer 2 may include an image acquiring module 20, a region setting module 21, a region dividing module 22, a calculating module 23, a luminance comparing module 24, and a result outputting module 25.

The image acquiring module 20 is configured for acquiring the image from the image sensor 10 in the camera module 1 through the data cable 4, and for displaying the image on the computer 2 so as to process the image.

When utilizing the system to test the camera module 1, the image acquired from the camera module 1 needs to be divided into a plurality of test regions and reference regions correspondingly. In the preferred embodiment, each test region corresponds to a reference region.

The region setting module 21 is configured for setting sizes of the test regions and the reference regions. A tester may set one or more sizes for the test regions by utilizing the region setting module 21. Therefore, the image may be divided into multiple test regions having different sizes, each of which has a corresponding reference region for comparison so as to provide accurate test results.

For example, the sizes of the test regions may be set as 5*5 pixels, 15*15 pixels, and 60*60 pixels, and the sizes of the reference regions may be set as 60*60 pixels. Each of the test regions having the size of 5*5 pixels may be compared with a corresponding reference region having the size of 60*60 pixels. If no defect is found, each of the test regions having the size of 15*15 pixels may be compared with a corresponding reference region having the size of 60*60 pixels. If no defect is then found, each of the test regions having the size of 60*60 pixels may be compared with a corresponding reference region having the size of 60*60 pixels.

For the purpose of acquiring more accurate test results, the region setting module 21 may set multiple sizes for the reference regions. For example, besides the size of 60*60 pixels as described above, the sizes of the reference regions may be set as 15*15 pixels. If no defect is found in any of the comparison processes as described above, each of the test regions having different sizes (i.e., 5*5 pixels, 15*15 pixels, and 60*60 pixels) may further be compared with a corresponding reference region having the size of 15*15 pixels.

After comparing all the test regions having different sizes with the reference regions, if no defect is found in the test regions, the camera module 1 is confirmed to be of satisfactory quality; otherwise, if any defect is found in any test region, the camera module 1 is confirmed to be of unsatisfactory quality.

The region setting module 21 is also configured for setting a gap size between each two adjacent test regions, for setting a spacing size between each test region and its corresponding reference region, and for setting a relative orientation between each test region and its corresponding reference region. In the preferred embodiment, the gap size is set as 4*4 pixels, and the spacing size is equal to the size of the reference region. For example, if the size of the reference region is 60*60 pixels, the spacing size is set as 60*60 pixels. The setting of the relative orientation between each test region and its corresponding reference region is illustrated in the description below in detail.

The region setting module 21 is further configured for setting a comparison formula to calculate a defect luminance, and for setting a standard value for the defect luminance. The standard value is set according to the specifications of the camera modules 1 when the camera modules 1 are manufactured. For example, the standard value is set as 4%. The comparison formula is illustrated in the following descriptions of the calculating module 23.

Figure 4:
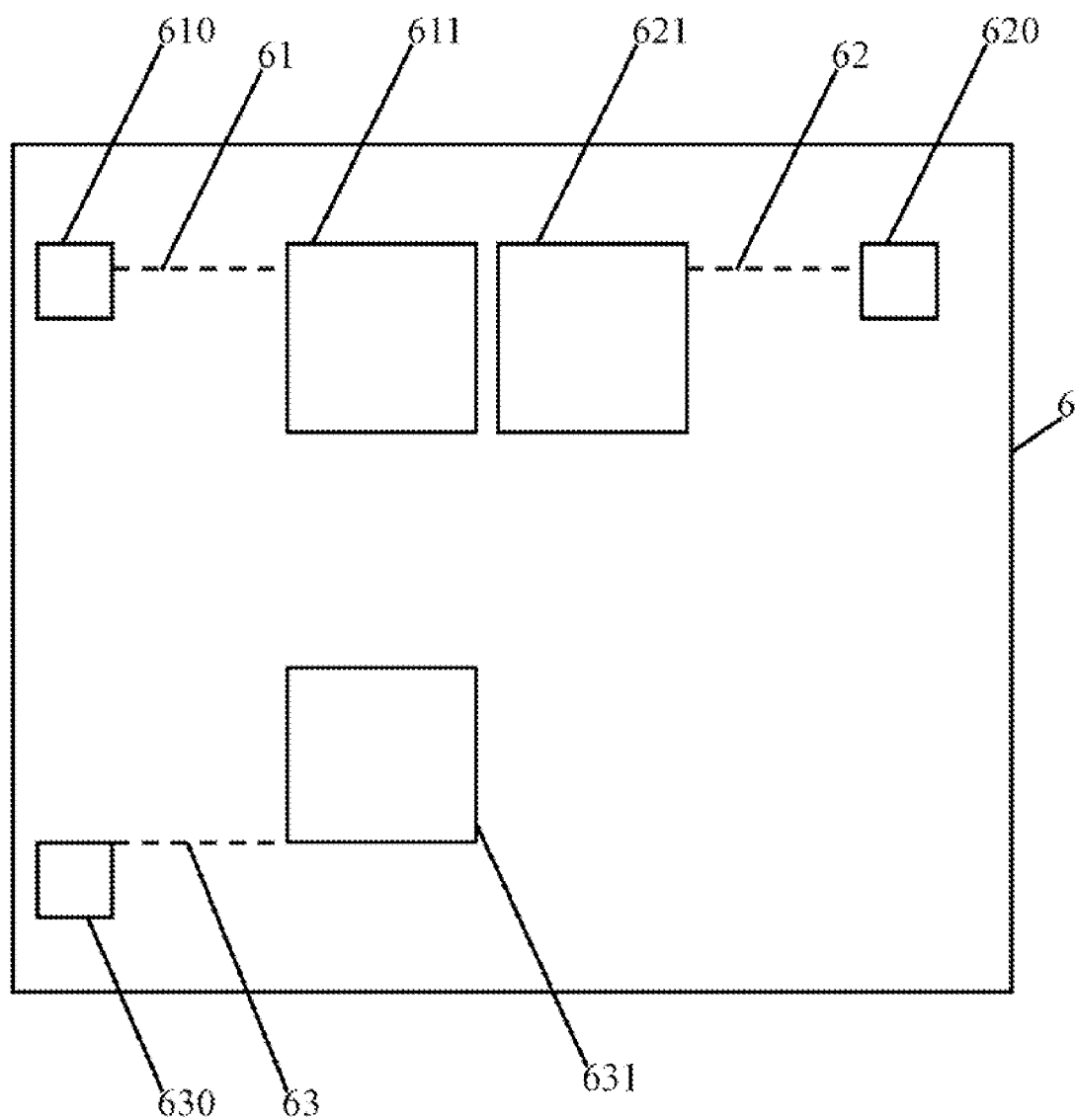
FIG. 4 is a schematic diagram illustrating a method for dividing an image into a plurality of test regions and corresponding reference regions.

The region dividing module 22 is configured for dividing the image into a plurality of test regions, and for plotting out a plurality of reference regions corresponding to the test regions according to the settings of the region setting module 21. Specifically, the region dividing module 22 divides the image into a plurality of test regions according to the sizes of the test regions and the gap size between each two adjacent test regions, and plots out the reference regions corresponding to the test regions according to the size of the reference regions, the spacing size, and the relative orientation. As shown in FIG. 4, an image 6 includes a test region 610 having a size of 15*15 pixels, and a reference region 611 having a size of 60*60 pixels corresponding to the test region 610.

In the process of plotting out the reference regions, the relative orientation is determined by the following steps according to coordinates of the test regions, coordinates of the reference regions, and coordinates of the image center: (a) determining whether the test region is in the left part of the image or in the right part of the image according to the coordinates of the test region and the coordinates of the image center; (b) determining the reference region is on the right of the test region if the test region is in the left part of the image, and determining the reference region is on the left of the test region if the test region is in the right part of the image; (c) determining whether a distance from the top right corner of the test region to the bottom of the image is less than a length of the reference region; (d) aligning the top of the test region with the top of the reference region horizontally if the distance from the top right corner of the test region to the bottom of the image is not less than the length of the reference region, and aligning the top of the test region with the bottom of the reference region horizontally if the distance from the top right corner of the test region to the bottom of the image is less than the length of the reference region.

For example, it can be assumed that the image, the test region and the reference region are squares; the test region is in the left part of the image; a point on the top right corner of the test region is A; a length of the reference region is C pixels, and the size of the reference region is C*C pixels; and a distance from the point A to the bottom of the image is D pixels. If the distance D is not less than the length C (D>=C), the top of the test region and the top of the reference region are aligned horizontally, that is, all points on the top of the test region and on the top of the reference region have the same Y coordinates. If the distance D is less than the length C (D<C), the top of the test region and the bottom of the reference region are aligned horizontally, that is, all points on the top of the test region and on the bottom of the reference region have the same Y coordinates (as illustrated in FIG. 4).

The setting of the relative orientation is for the purpose of ensuring each test region has a corresponding reference region inside the image. In other embodiments, the sizes of the test regions and the reference regions, the gap size, the spacing size, and the relative orientation can be changed or adjusted according to specific test requirements. For example, when determining the relative orientation, the region dividing module 22 may determine whether the test region is in the upper half or the lower half of the image in step (a).

The calculating module 23 is configured for selecting one of the test regions and confirming a reference region corresponding to the selected test region, and for calculating averages of gray scale values of the selected test region and the confirmed reference region. The calculating module 23 may be preset to select the test regions in a particular sequence, i.e., from top to down, or from left to right of the image. For example, the average of gray scale values of the selected test region is calculated according to the gray scale values of all points in the selected test region. In addition, the calculated average of gray scale values is calculated from the arithmetic mean determined from the summation of the gray scale value of each point or pixel in the selected test region with respect to the total number of points or pixels.

The gray scale value of each point is calculated according to the following formula in this preferred embodiment: gray scale value=0.3*red+0.59*green+0.11*blue. Three primitive color signals (red, green, and blue) are produced by the camera module 1. For example, it is assumed that the size of the selected test region is 5*5 pixels, 25 points may be chosen in the selected test region, and each point corresponds to a gray scale value, then the calculating module 23 calculates the average of gray scale values of the selected test region according to the gray scale values of the 25 points. Coordinates of the 25 points are shown in the table below:

| (x − 2, y − 2) | (x − 1, y − 2) | (x, y − 2) | (x + 1, y − 2) | (x + 2, y − 2) |
|---|---|---|---|---|
| (x − 2, y − 1) | (x − 1, y − 1) | (x, y − 1) | (x + 1, y − 1) | (x + 2, y − 1) |
| (x − 2, y) | (x − 1, y) | (x, y) | (x + 1, y) | (x + 2, y) |
| (x − 2, y + 1) | (x − 1, y + 1) | (x, y + 1) | (x + 1, y + 1) | (x + 2, y + 1) |
| (x − 2, y + 2) | (x − 1, y + 2) | (x, y + 2) | (x + 1, y + 2) | (x + 2, y + 2) |

By performing averaging of the gray scale values of the aforementioned 25 points, a calculated average of gray scale values can be determined.

The calculating module 23 is further configured for calculating a defect luminance of the selected test region according to the calculated averages of gray scale values by utilizing the comparison formula. It is assumed that the calculated average of the gray scale values of the selected test region is M, and the calculated average of the gray scale values of the confirmed reference region is N, then the comparison formula is expressed as: defect luminance=(1−M/N)*100%.

The luminance comparing module 24 is configured for comparing the calculated defect luminance with the standard value, thereby confirming whether the selected test region has visible defects and whether the camera module 1 is of satisfactory quality. For example, the standard value is set as 4%.

Specifically, if the defect luminance of any test region is larger than the standard value, the luminance comparing module 24 confirms the test region has visible defects and the camera module 1 is of unsatisfactory quality. Otherwise, if the defect luminance of each test region is not larger than the standard value, the luminance comparing module 24 then confirms that no visible defects exist in all of the test regions, and the camera module 1 is deemed of satisfactory quality.

The result outputting module 25 is configured for outputting various settings, calculated data, and test results into a table or a report, and for storing various forms of data into the database 3. As shown in FIG. 5, the result outputting module 25 outputs an Excel™ table, which includes a size of test regions, a size of reference regions, a spacing size, an average of gray scale values of a selected test region, a standard value, equation for the gray scale value, and a defect luminance of the selected test region, etc. The tester may find out why the camera module 1 is of unsatisfactory quality by performing troubleshooting and root cause analysis according to the data in the Excel™ table.

Figure 3:
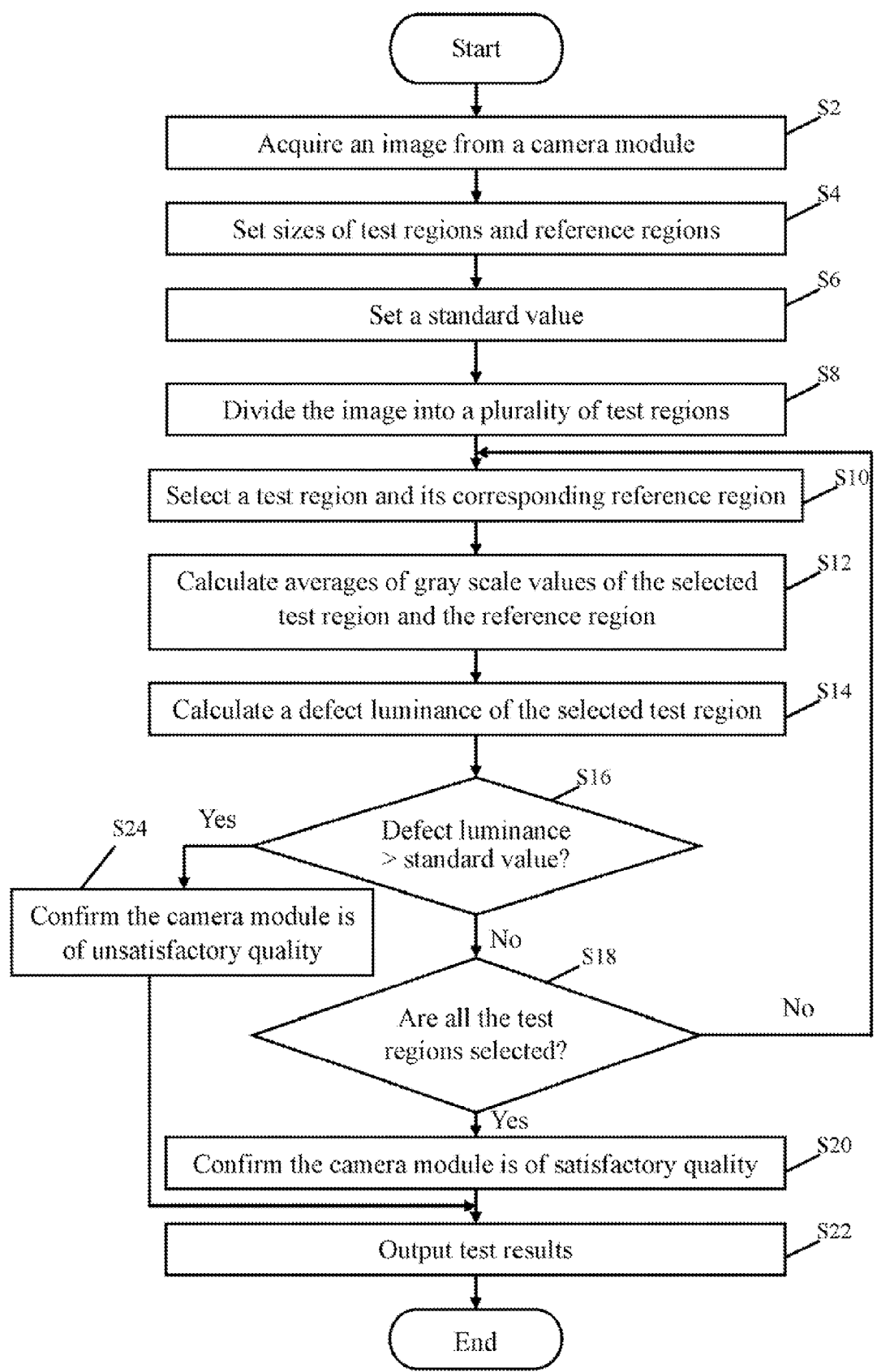
FIG. 3 is a flow chart illustrating a method for detecting defects in camera modules in accordance with the preferred embodiment.

FIG. 3 is a flow chart illustrating a method for detecting defects in camera modules in accordance with the preferred embodiment. In step S2, the image acquiring module 20 acquires the image from the camera module 1 through the data cable 4, and displays the image on the computer 2.

In step S4, the region setting module 21 sets the sizes of the test regions and the reference regions, the gap size between each two adjacent test regions, the spacing size between each test region and its corresponding reference region, and the relative orientation between each test region and its corresponding reference region.

In step S6, the region setting module 21 sets the standard value for the defect luminance, and sets the comparison formula to calculate the defect luminance of the test regions.

In step S8, the region dividing module 22 divides the image into a plurality of test regions according to the size of the test regions and the gap size, and plots out a plurality of reference regions corresponding to the test regions respectively according to the size of the reference regions, the spacing size and the relative orientation.

In step S10, the calculating module 23 selects one of the test regions and confirms the reference region corresponding to the selected test region.

In step S12, the calculating module 23 calculates the average of gray scale values of the selected test regions and the average of gray scale values of the confirmed reference region. The calculated average of gray scale values is calculated from the arithmetic mean determined from the summation of the gray scale values of each point or pixel in the selected test region with respect to the total number of points or pixels. In addition, the gray scale value of each point is calculated using the following formula: gray scale value=0.3*red+0.59*green+0.11*blue.

In step S14, the luminance comparing module 24 calculates the defect luminance of the selected test region according to the calculated averages of gray scale values of the selected test region and the confirmed reference region by utilizing the comparison formula. The comparison formula is expressed as: defect luminance=(1−the calculated average of gray scale values of the selected test region/the calculated average of gray scale values of the confirmed reference region)*100%.

In step S16, the luminance comparing module 24 compares the defect luminance with the standard value, and determines whether the defect luminance is larger than the standard value. If the defect luminance is not larger than the standard value, go to step S18, in which the calculating module 23 determines whether all test regions have been selected. If there are one or more test regions which have not been selected, the procedure goes to step S10, that is, the calculating module 23 selects another test region.

If all test regions have been selected as determined at step S18, go to step S20. In step S20, the luminance comparing module 24 confirms that the image has no visible defects, thereby determining that the camera module 1 is of satisfactory quality.

In step S22, the result outputting module 25 outputs the settings, the calculated data, and the test results into the table/report, and stores various data into the database 3.

If the defect luminance is larger than the standard value as determined in step S16, go to step S24. In step S24 the luminance comparing module 24 confirms that the image has visible defects, thereby determining the camera module 1 is of unsatisfactory quality, and then the procedure goes to step S22.

In the above-described flow chart for FIG. 3, the region setting module 21 sets one size for the test regions (i.e., 15*15 pixels) and one size for the reference regions (i.e., 60*60 pixels). If no visible defects have been found in step S16 after selecting all the test regions, the procedure may go back to step S4 to set more sizes for the test regions and the reference regions (i.e., 5*5 pixels, 60*60 pixels, etc.), for the purpose of acquiring more accurate test results.

FIG. 4 is a schematic diagram illustrating a method for dividing the image into a plurality of test regions and corresponding reference regions. The image 6 is acquired from the camera module 1 by the acquiring module 20; and the image 6 is divided into a plurality of test regions and corresponding reference regions by utilizing the region dividing module 22 according to the settings of the region setting module 21. In FIG. 4, the reference region 611 corresponds to the test region 610, and the spacing size 61 is equal to the size of the reference region 611.

The size of the test regions 610, 620, and 630 is 15*15 pixels, the size of the reference regions 611, 621, and 631 is 60*60 pixels, and the spacing size 61, 62, and 63 is 60*60 pixels.

FIG. 5 is a schematic diagram illustrating a method for outputting data. The result outputting module 25 outputs various data into the Excel™ table, and stores the Excel™ table into the database 3. The Excel™ table shown in FIG. 5 includes the size of the test regions, the size of the reference regions, the spacing size, the standard value, the defect luminance of the test region, and the test result. The tester may change the contents in the Excel™ table, such as edit, add, or delete data.

The result outputting module 25 also may output all kinds of data into other files having different formats, such as WORD™, PDF™, and so on.

It should be emphasized that the above-described embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A system for detecting defects in camera modules, comprising:
    an image acquiring module configured for acquiring an image from the camera modules;
    a region setting module configured for setting a comparison formula to calculate defect luminance, and for setting a standard value for the defect luminance;
    a region dividing module configured for dividing the image into a plurality of test regions, and for plotting out a plurality of reference regions corresponding to the test regions;
    a calculating module configured for selecting each of the test regions and confirming a reference region corresponding to the selected test region, for calculating averages of gray scale values of the selected test region and the confirmed reference region, and for calculating a defect luminance of the selected test region according to the calculated averages of gray scale values of the selected test region and the confirmed reference region by utilizing the comparison formula; and
    a luminance comparing module configured for comparing the calculated defect luminance with the standard value, for confirming whether the camera module is of satisfactory quality by testing whether the defect luminance of each test region is not larger than the standard value.

2. The system as claimed in claim 1, wherein the region setting module is further configured for setting sizes of the test regions and the reference regions, for setting a gap size between each two adjacent test regions, for setting a spacing size between each test region and its corresponding reference region, and for setting a relative orientation between each test region and its corresponding reference region.

3. The system as claimed in claim 1, wherein the standard value is set according to specifications of the camera modules.

4. The system as claimed in claim 1, further comprising a result outputting module configured for acquiring a plurality of test results, and outputting and storing the test results.

5. The system as claimed in claim 1, wherein the comparison formula is expressed as: defect luminance=(1−the average of gray scale values of the selected test region/the average of gray scale values of the confirmed reference region) *100%.

6. A method for detecting defects in camera modules, comprising:
    acquiring an image from the camera modules;
    setting a comparison formula to calculate a defect luminance;
    setting a standard value for the defect luminance;
    dividing the image into a plurality of test regions;
    plotting out a plurality of reference regions corresponding to the test regions;
    selecting a test region and confirming a reference region corresponding to the selected test region;
    calculating averages of gray scale values of the selected test region and the confirmed reference region;
    calculating a defect luminance of the selected test region according to the calculated averages of gray scale values of the selected test region and the confirmed reference region by utilizing the comparison formula;
    comparing the calculated defect luminance with the standard value;
    repeating the selecting the test region step through the comparing the calculated defect luminance step to test each of the other test regions if the defect luminance is not larger than the standard value; and
    confirming whether the camera module is of satisfactory quality based on the test results in the comparing step.

7. The method according to claim 6, wherein the confirming step comprises:
    confirming that the camera module is of unsatisfactory quality if the defect luminance of any one of the test regions is larger than the standard value, and
    confirming that the camera module is of satisfactory quality if the defect luminance of each of the test regions is not larger than the standard value.

8. The method according to claim 6, further comprising:
acquiring a plurality of test results and outputting the test results.

9. The method according to claim 6, further comprising before the dividing step:
setting sizes of the test regions and the reference regions;
setting a gap size between each two adjacent test regions;
setting a spacing size between each test region and its corresponding reference region; and
setting a relative orientation between each test region and its corresponding reference region.

10. The method according to claim 9, wherein the step of setting a relative orientation between each test region and its corresponding reference region comprises:
   (a) determining whether the test region is in the left part of the image or in the right part of the image according to coordinates of the test region and coordinates of the image center;
   (b) determining the reference region is on the right of the test region if the test region is in the left part of the image, and determining the reference region is on the left of the test region if the test region is in the right part of the image;
   (c) determining whether a distance from the top right corner of the test region to the bottom of the image is less than a length of the reference region; and
   (d) aligning the top of the test region with the top of the reference region horizontally if the distance from the top right corner of the test region to the bottom of the image is not less than the length of the reference region, and aligning the top of the test region with the bottom of the reference region horizontally if the distance from the top right corner of the test region to the bottom of the image is less than the length of the reference region.

11. The method according to claim 6, wherein the comparison formula is expressed as: defect luminance=(1−the average of gray scale values of the selected test region/the average of gray scale values of the confirmed reference region)*100%.

* * * * *